US008724095B2

(12) United States Patent
Goodwin et al.

(10) Patent No.: US 8,724,095 B2
(45) Date of Patent: *May 13, 2014

(54) OPTICAL ASSEMBLY FOR LASER RADAR (75) Inventors: Eric Peter Goodwin, Tucson, AZ (US);
Daniel Gene Smith, Tucson, AZ (US);
Brian L. Stamper, Tucson, AZ (US);
Alexander Cooper, Belmont, CA (US);
Alec Robertson, Palo Alto, CA (US)

(73) Assignee: Nikon Corporation, Tokyo (JP)

( * ) Notice: Subject to any disclaimer, the term of this patent is extended or adjusted under 35 U.S.C. 154(b) by 240 days.

This patent is subject to a terminal disclaimer.

(21) Appl. No.: 13/281,397

(22) Filed: Oct. 25, 2011

(65) Prior Publication Data
US 2013/0099957 A1  Apr. 25, 2013

(51) Int. Cl.
*G01C 3/08* (2006.01)
(52) U.S. Cl.
USPC .......................... 356/5.01; 356/3.01; 356/4.01
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,733,609 A | 3/1988 | Goodwin et al. |
| 4,824,251 A | 4/1989 | Slotwinski et al. |
| 4,830,486 A | 5/1989 | Goodwin |
| 4,969,736 A | 11/1990 | Slotwinski |
| 5,114,226 A | 5/1992 | Goodwin et al. |
| 5,196,713 A * | 3/1993 | Marshall .................. 250/559.31 |
| 6,285,476 B1 | 9/2001 | Carlson |
| 6,556,338 B2 | 4/2003 | Han |
| 7,139,446 B2 | 11/2006 | Slotwinski |
| 7,379,191 B2 | 5/2008 | Brooks |
| 7,925,134 B2 | 4/2011 | Slotwinski et al. |
| 2008/0205246 A1 * | 8/2008 | Shimano et al. ......... 369/112.16 |
| 2008/0285058 A1 | 11/2008 | Holzapfel |
| 2009/0034061 A1 | 2/2009 | Dodoc |

FOREIGN PATENT DOCUMENTS

EP  0283222  9/1988

OTHER PUBLICATIONS

U.S. Appl. No. 13/281,393, filed Oct. 25, 2011, Goodwin et al.
U.S. Appl. No. 13/828,221, filed Mar. 14, 2013, Goodwin et al.
International Search Report and Written Opinion from International Application No. PCT/US2011/057758 dated Feb. 16, 2012, 14 pp.

* cited by examiner

Primary Examiner — Luke Ratcliffe
(74) Attorney, Agent, or Firm — Klarquist Sparkman, LLP (57) ABSTRACT A compact optical assembly for a laser radar system is provided, that is configured to move as a unit with a laser radar system as the laser radar system is pointed at a target and eliminates the need for a large scanning (pointing) mirror that is moveable relative to other parts of the laser radar. The optical assembly comprises a light source, a lens, a scanning reflector and a fixed reflector that are oriented relative to each other such that: (i) a beam from the light source is reflected by the scanning reflector to the fixed reflector; (ii) reflected light from the fixed reflector is reflected again by the scanning reflector and directed along a line of sight through the lens; and (iii) the scanning reflector is moveable relative to the source, the lens and the fixed reflector, to adjust the focus of the beam along the line of sight.

26 Claims, 9 Drawing Sheets

OPTICAL ASSEMBLY FOR LASER RADAR

BACKGROUND

Laser radar is a versatile metrology system that offers non-contact and true single-operator inspection of an object (often referred to as a target). Laser radar metrology provides high quality object inspection data that is particularly useful for numerous industries such as aerospace, alternative energy, antennae, satellites, oversized castings and other large-scale applications.

Known concepts for Laser radar systems are disclosed in U.S. Pat. Nos. 4,733,609; 4,824,251; 4,830,486; 4,969,736; 5,114,226; 7,139,446; 7,925,134; and Japanese Patent 2,664,399 which are incorporated by reference herein. The laser beam is directed from the laser radar system towards the target. The laser beam directed from the laser radar system may pass through a splitter which directs the laser beam along a measurement path and at the target, as disclosed in U.S. Pat. Nos. 4,733,609; 4,824,251; 4,830,486; 4,969,736; 5,114,226; 7,139,446; 7,925,134; and Japanese Patent 2,664,399. The laser beam directed along the measurement path is reflected back from, or scattered by, the target and a portion of that reflected or scattered laser beam is received back at the laser radar system where it is detected and processed to provide information about the target. The detection and processing of the reflected, or scattered, light is provided according to U.S. Pat. Nos. 4,733,609; 4,824,251; 4,830,486; 4,969,736; 5,114, 226; 7,139,446; 7,925,134; and Japanese Patent 2,664,399; which are incorporated by reference and form no part of the present invention. The present invention is directed at the optical assembly by which a pointing beam and measurement laser beam are transmitted from the laser radar system.

An existing laser radar system has a relatively large rotating scanning (pointing) mirror that rotates relative to other parts of the laser radar system and is used to achieve beam pointing. This mirror causes system instability and polarization issues. The existing system is also not achromatic, so the two wavelengths (e.g. the pointing beam wavelength and the measurement beam wavelength) cannot be focused on a part in space simultaneously. Moreover, the existing system limits the field of view of the camera that is pointed in the same direction as the laser radar.

SUMMARY OF THE PRESENT INVENTION

The present invention provides a compact optical assembly—also referred to as an Integrated Optical Assembly (IOA) that is useful in a laser radar system and is also useful in various other optical systems.

In a laser radar system, the optical assembly is configured to move as a unit as the laser radar system is pointed at a target, and thus eliminates the need for a large scanning (pointing) mirror that is moveable relative to other parts of the laser radar system.

The optical assembly is designed to be compact and to utilize a relatively simple assembly of elements for directing a pointing beam and a measurement beam through an outlet of the optical radar system.

In a laser radar system with an optical assembly according to the invention, the pointing beam is produced in a visible (e.g. red) wavelength range and the measurement beam is produced in a different, predetermined, wavelength range (e.g. infra red, or IR). The pointing and measurement beams are handled by the compact optical assembly of the present invention, which moves as a unit with the laser radar system to direct the pointing and measurement beams along a line of sight. This enables the laser radar system to direct the pointing and measurement beams at the target in a manner that avoids the use of a scanning (pointing) mirror that is moveable relative to other components of the laser radar.

According to a basic aspect of the present invention, the optical assembly is configured to direct a pointing beam and a measurement beam along a line of sight and through an outlet of the laser radar system. The optical assembly comprises a light source, a lens, a scanning reflector and a fixed reflector that co-operate to focus the pointing and measurement beams from the light source along a line of sight that extends through the lens. The light source, the lens, the scanning reflector and the fixed reflector are oriented relative to each other such that the pointing and measurement beams from the light source are reflected by the scanning reflector to the fixed reflector. The reflected pointing and measurement beams from the fixed reflector are reflected again by the scanning reflector and directed along the line of sight through the lens. The scanning reflector is moveable relative to the source, the lens and the fixed reflector, to adjust the focus of the pointing and measurement beams along the line of sight.

According to a preferred embodiment of the present invention, the scanning reflector comprises a retroreflector and the fixed reflector comprises a plane mirror. The source, the lens and the plane mirror are all in fixed locations relative to a support structure for the optical assembly while the retroreflector is moveable relative to those fixed locations to vary the focus of the pointing and measurement beams along the line of sight.

The following detailed description also provides several versions of the optical assembly of the present invention. In one version, the retroreflector comprises a corner cube that has at least three reflective surfaces that are oriented so that: (i) the pointing and measurement beams from the source are reflected through the corner cube to a plane mirror; (ii) the pointing and measurement beams reflected from the plane mirror are again reflected through the corner cube; and (iii) movement of the corner cube in at least one predetermined direction adjusts the focus of the pointing and measurement beams along the line of sight in a manner that is substantially unaffected by movement of the corner cube in directions transverse to the predetermined direction or by rotations of the corner cube relative to the predetermined direction.

In another version of an optical assembly according to the present invention, the scanning reflector comprises a reflective roof that provides two reflections of the pointing and measurement beams and the fixed reflector comprises an additional reflective roof that provides two reflections of the pointing and measurement beams. The nodal lines of both reflective roofs are in a predetermined orientation relative to each other.

The following detailed description also provides concepts for configuring and orienting the components of the optical assembly. Those concepts are designed, for example, to reduce the weight of the optical assembly and improve the performance of the optical assembly while keeping the optical assembly as compact as possible.

In one concept, the pointing and measurement beams reflected by the scanning reflector and directed along the line of sight through the lens are reflected by a fold mirror that folds the light of sight of the pointing and measurement beams directed through the lens. The source comprises an optical fiber supported by the fold mirror.

In a second concept, the lens, the beam source and the plane mirror are supported in a manner such that they can move as a unit relative to the retroreflector so that the line of sight moves with the unit.

In a third concept, the pointing and measurement beams reflected by the scanning reflector, and directed along the line of sight through the lens, are reflected by a polarization beam splitter that folds the line of sight of the pointing and measurement beams directed through the lens. Here, the source comprises an optical fiber in a predetermined location relative to the polarization beam splitter that folds the light of sight of the pointing and measurement beams directed through the lens.

In a fourth concept, the source comprises an optical fiber supported by a monolithic member with a portion that functions as the plane mirror and another portion that folds the line of sight of the pointing and measurement beams reflected by the scanning reflector and directed along the line of sight through the lens.

In a fifth concept, the source comprises an optical fiber supported by a transmissive member that also supports the plane mirror.

Additional features of the present invention will become apparent from the following detailed description and the accompanying drawings and exhibit.

BRIEF DESCRIPTION OF THE DRAWINGS

Some of which Include Exemplary Dimensions of Components or Exemplary Translational Distances Over which Components are Designed to Move

DETAILED DESCRIPTION

As described above, the present invention provides an optical assembly that is moveable as a unit with a laser radar system and is configured to transmit a pointing beam and a measurement beam from the laser radar system towards a target at which the laser radar system is pointed. The present invention is described herein in connection with a laser radar system of the type described in U.S. Pat. Nos. 4,733,609; 4,824,251; 4,830,486; 4,969,736; 5,114,226; 7,139,446; 7,925,134; and Japanese Patent 2,664,399 which are incorporated herein by reference, and from that description the manner in which the present invention can be implemented with various types of laser radar systems will be apparent to those in the art.

Figure 1:
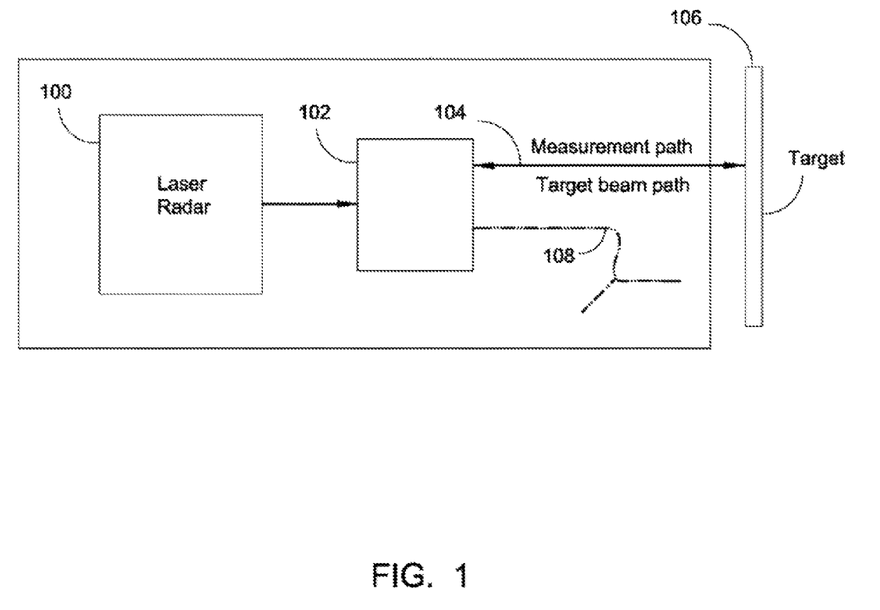
FIG. 1 is a schematic illustration of a laser radar system of a type that can employ an optical assembly according to the present invention.
Figure 2:
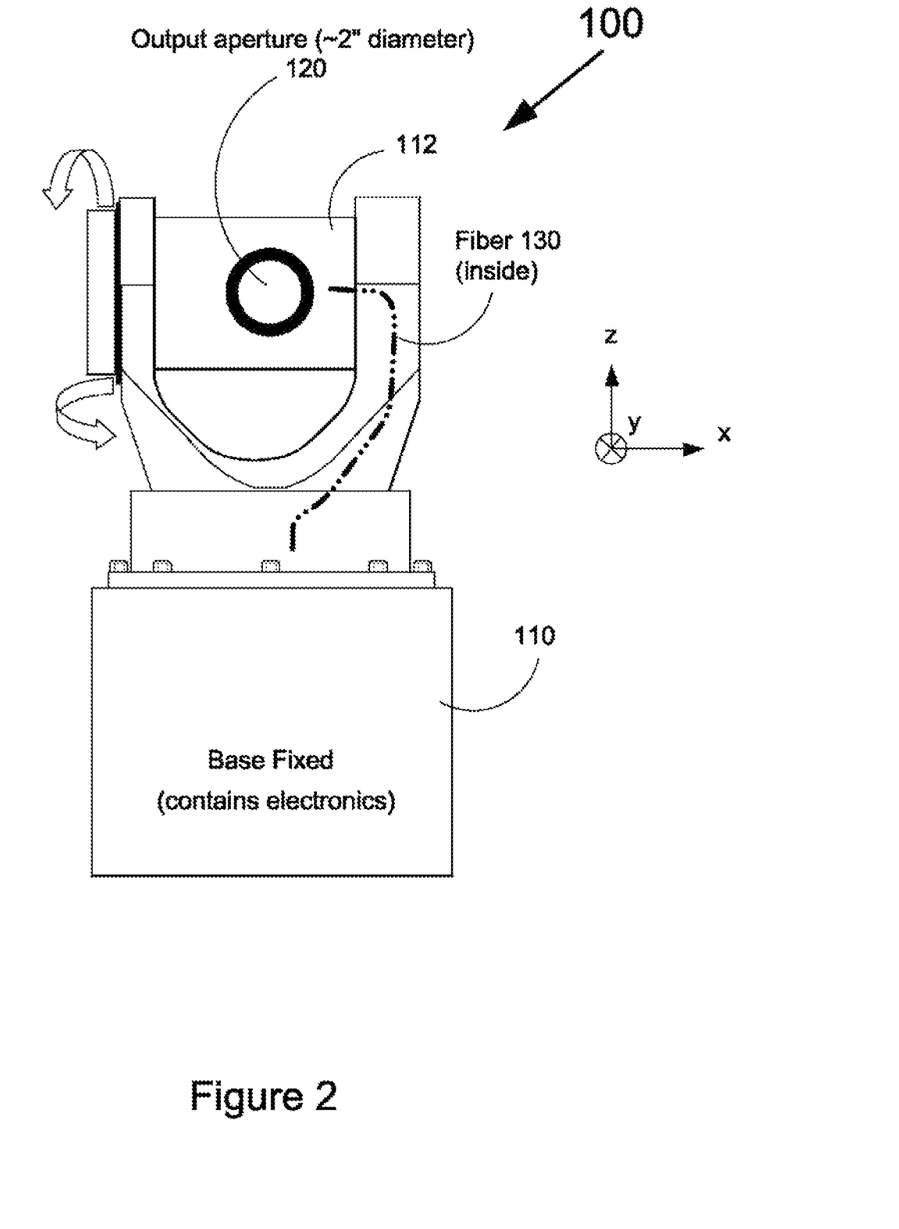
FIG. 2 is a front view of a preferred type of laser radar system that can employ an optical assembly according to the present invention.

As shown in FIGS. 1 and 2 a laser radar system 100 produces a pointing beam in a visible (e.g. red) wavelength range and a measurement beam in a different (e.g. infra red, IR) wavelength range, and directs (transmits) the pointing and measurement beams to an outlet 120 of the laser radar system. The pointing beam is used to identify a point (or spot) on a target 106 at which the measurement beam is directed. The measurement beam may pass through a splitter 102 (that is part of the fiber components of the laser radar system 100), which directs the measurement beam (and the pointing beam) along a measurement path 104 and at the spot on the target 106, and sends a portion of the measurement beam through a circuit 108 where that portion of the laser beam is processed in a manner described in U.S. Pat. Nos. 4,733,609, 4,824,251, 4,830,486, 4,969,736, 5,114,226, 7,139,446, 7,925,134, and Japanese Patent #2,664,399. The measurement beam directed along the measurement path 104 is reflected or scattered from the spot on the target 106 and a portion of that reflected or scattered measurement beam is received back at the laser radar system 100 where it is detected and processed to provide information about the target 106. The detection and processing of the reflected or scattered light from the measurement beam is provided in a base 110 of the laser radar system 100, and is configured to detect and process the reflected light according to U.S. Pat. Nos. 4,733,609, 4,824, 251, 4,830,486, 4,969,736, 5,114,226, 7,139,446, 7,925,134, and Japanese Patent #2,664,399, which are incorporated by reference and form no part of the present invention. The present invention is directed at the optical assembly by which the pointing beam and measurement beam are transmitted to the outlet 120 of the laser radar system.

In a known laser radar system, a moveable mirror is provided for directing the pointing beam at a target. The moveable mirror is separate from the optics that transmit the measurement beam and requires a relatively large laser radar housing to accommodate both the moveable mirror and the laser radar optics. In contrast, the present invention is relatively compact because both the measurement beam and pointing beam are directed by a compact optical assembly that can move as a unit with the laser radar system 100. Moreover, the optical assembly of the present invention is designed to be relatively stable in performing its beam transmission/reception functions.

As shown in FIG. 2, the laser radar system 100 includes a housing (e.g. a rotatable cylinder 112) in which the optical assembly is located and secured so that the optical assembly moves as a unit with the cylinder 112 relative to the base 110 of the laser radar system. The laser radar system includes an outlet 120 in the housing 112, through which light (e.g. in the two wavelengths of the pointing and measurement beams) is directed from the laser radar system. The base 110 contains the processing features of the laser radar system, that are disclosed in U.S. Pat. Nos. 4,733,609, 4,824,251, 4,830,486, 4,969,736, 5,114,226, 7,139,446, 7,925,134, and Japanese Patent #2,664,399.

Figures 3A, 3B:
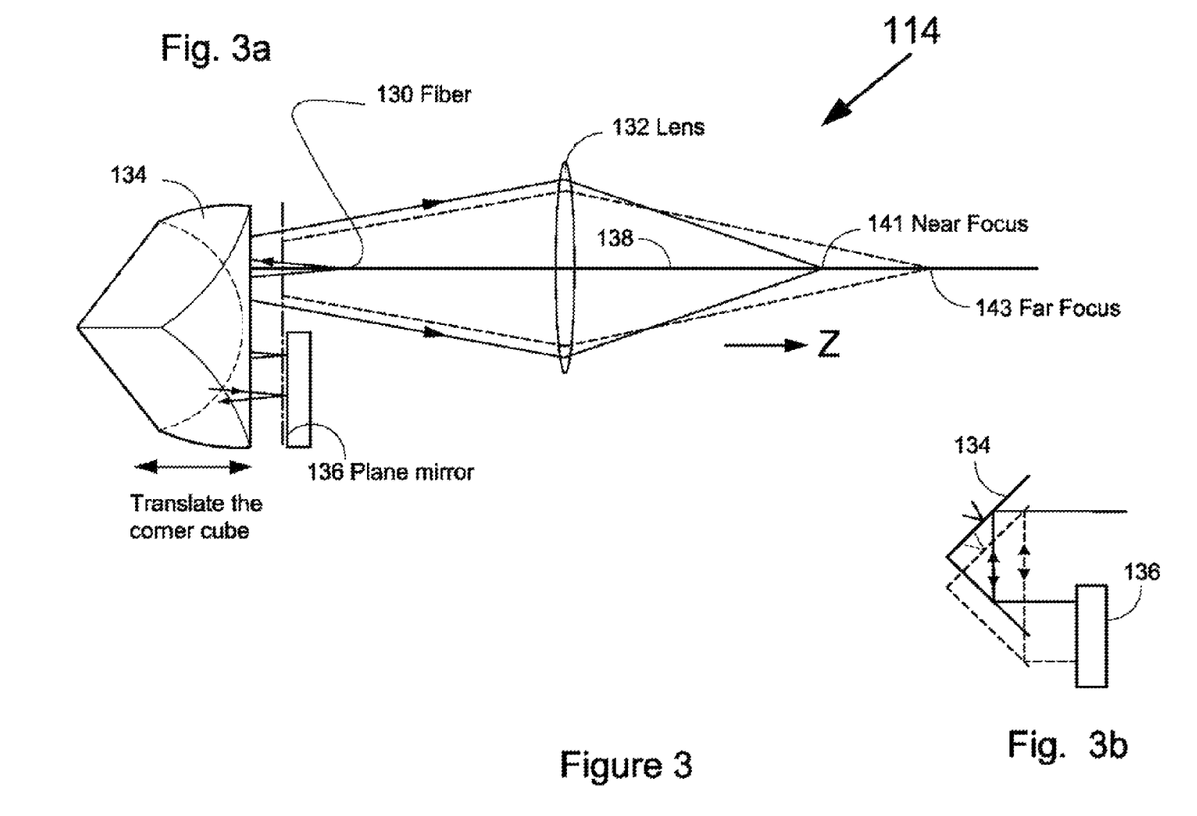
FIG. 3a is a schematic illustration of one version of an optical assembly according to the present invention.
FIG. 3b is a fragmentary, schematic illustration of the optical assembly of FIG. 3a showing the reflection schema provided by the corner cube and the plane mirror.

Certain basic features of an optical assembly 114 of the present invention can be appreciated from FIGS. 3a and 3b. The optical assembly of FIG. 3a comprises a light source represented by a fiber 130 through which a pointing beam and a measurement beam are directed, a lens 132, a scanning reflector 134 and a fixed reflector that in FIG. 3a comprises a plane mirror 136. Those components co-operate to direct and focus the pointing and measurement beams from the fiber 130 along a line of sight 138 that preferably coincides with the optical axis of the optical assembly and extends through the lens 132. The fiber 130, the lens 132, the scanning reflector 134 and the plane mirror are oriented relative to each other such that the pointing and measurement beams from the fiber 130 are reflected by the scanning reflector 134 to the plane mirror 136, and reflected pointing and measurement beams from the plane mirror 136 are reflected again by the scanning reflector 134 and directed along the line of sight 138 through the lens 132. The pointing and measurement beams are then directed from the laser radar system towards the target 106.

In the embodiment of FIG. 3a, the scanning reflector 134 comprises a retroreflector—preferably a corner cube—that translates (e.g. in the z direction) relative to the fiber 130, the lens 132 and the plane mirror 136 which are all fixed to the support structure of the optical assembly. Movement (or translation) of the corner cube 134 adjusts the focus of the pointing and measurement beams along the line of sight 138 by changing the total path length, or distance, the beams travel between the fiber 130 and the lens 132. The corner cube 134 has at least three reflective surfaces that are oriented so that: (i) the pointing and measurement beams from the source are reflected through the corner cube 134 to the plane mirror 136; (ii) the pointing and measurement beams reflected from the plane mirror 136 are again reflected through the corner cube 134; and (iii) movement of the corner cube in at least one predetermined direction (e.g. the z direction in FIG. 3a) adjusts the focus of the pointing and measurement beams along the line of sight 138 in a manner that is substantially unaffected by movement of the corner cube in directions transverse to the predetermined direction or by rotations of the corner cube relative to the predetermined direction. FIG. 3b is a fragmentary, schematic illustration of the optical assembly of FIG. 3a, showing the reflection schema provided by the corner cube 134 and the plane mirror 136, that makes the reflection of the pointing and measurement beams unaffected by movement of the corner cube 134 in directions transverse to the z direction. The corner cube 134 in FIG. 3a has well understood properties as a retroreflector, namely that rotations of the corner cube about the x, y or z axes does not change the relationship between the angle of the input and output beams; in other words, the input beam and output beam remain parallel to each other regardless of the corner cube rotation. Therefore, any unwanted rotation or translation of the corner cube relative to the z direction will not change the ability of the system in FIG. 3a to repeatably maintain the line of sight of the measurement and pointing beams.

The fiber 132 is associated with a fiber beam combiner that combines a pointing beam in the visible (e.g. red) wavelength range with the measurement beam in the different, e.g. infra red (IR) wavelength range. The pointing beam and measurement beams are generated from separate sources, and are combined by the fiber beam combiner (that is located inside the base 110) in a manner well known to those in the art. The combined pointing and measurement beams are directed from the fiber 130 and focused along the line of sight 138 in the manner described herein.

Thus, with the embodiment shown in FIGS. 3a and 3b, the pointing and measurement beams are directed along the line of sight 138 and the focus of the pointing and measurement beams along the line of sight is adjusted by translation of a single element (i.e. the corner cube 134) in a way that is insensitive to (i.e. unaffected by) movement of the corner cube in directions transverse to the z direction or by rotation of the corner cube relative to the z direction. Also, the optical assembly of FIGS. 3a and 3b is extremely compact being made up of relatively few elements. In one example system, the numerical aperture of the light leaving the fiber 130 and the desired beam diameter at the lens 132 dictate that the total path length from the fiber to the lens must change by 88 mm to change between a near focus 141 distance of 1 meter and far focus 143 distance of 60 meters. However, because the beam traverses the corner cube twice between the fiber 130 and the lens 132, the corner cube only needs to translate about 88/4=22 mm relative to the fixed components (fiber, plane mirror and lens), which contributes to the compactness of the optical assembly.

With the embodiment of FIGS. 3a and 3b, the pointing and measurement beams are directed along the line of sight and to the outlet 120 of the laser radar system. The pointing and measurement beams are directed from the laser radar system and to a spot on the target 106, where the light is reflected and/or scattered by the target. In accordance with the principals of a laser radar system, the optical assembly 114 will receive at least some light that is reflected or scattered from the target 106 and that radiation will be coupled back through the fiber 130 in a manner that will be apparent to those in the art.

The size of the imaged spot of the measurement beam on the target 106 determines how much light can be collected by the optical assembly. If more light is focused onto the target, more light is reflected or scattered by the target and an appropriate fraction of that reflected or scattered light is collected by the optical assembly and focused back to the fiber 130, allowing an accurate measurement of the distance between the laser radar and the target. In other words, a smaller spot allows more measurement light to return to the optical assembly and a more accurate distance measurement to be made, using the techniques described by U.S. Pat. Nos. 4,733,609, 4,824,251, 4,830,486, 4,969,736, 5,114,226, 7,139,446, 7,925,134, and Japanese Patent #2,664,399, which are incorporated by reference herein.

Another advantage of this optical system is that the lens can be designed such that the pointing beam (visible wavelength) and the measurement beam (infrared wavelength) of a laser radar system can be focused simultaneously at the same axial distance along the line of sight, for example over a range from 1 meter to 60 meters from the output aperture of the laser radar system. Although not necessary for making accurate distance measurements, it is an advantage for any user of the system to be able to see where the instrument is pointed during a measurement.

In the optical assembly of FIGS. 3a and 3b, the provision of the plane mirror 136 which is fixed in relation to the corner cube 134 sends the first pass beam that leaves the corner cube back through the corner cube, while the system remains insensitive to tip/tilt of the translating corner cube relative to the z direction. The lateral translation of the corner cube 134 in the z direction still causes a shift on the first pass but the plane mirror 136 reverses the beam back through the corner cube where it picks up an equal and opposite shift, such that the total shift of the beam is zero. As described earlier, rotations of a corner cube (i.e. tip and tilt) do not change the angle of the output beam relative to the input beam, which is well understood by those in the art. In addition, rotation about the z-axis does not change the angle of the output beam relative to the input beam. Thus, the system in FIG. 3a is nominally insensitive to rotations about x (tip), y (tilt) and z (yaw) axes; and translations along the x and y axes of the corner cube. The sixth and final degree of freedom is translation along z, which is responsible for the total path length change which allows this system to vary the focus location of the measurement and pointing beams along a line of sight 138. FIG. 3b shows how the fixed plane mirror 136 makes the system insensitive to x/y motions of the corner cube.

In addition, since the laser radar system uses two wavelengths and the system is sensitive to backreflections, the corner cube 134 could also be a set of three mirrors (an air-corner cube) rather than a solid glass traditional corner cube. Then, each beam is incident on a first surface mirror, so there are no surfaces to create a ghost image that can contribute to the noise floor for the distance measuring component of the laser radar, other than the surfaces of the 2" lens for providing the optical power.

Since the corner cube 134 is traversed by the beam twice and is reflected, the optical path change between the fiber 130 and the lens 132 is four times the motion of the corner cube—a 1 mm motion of the corner cube changes the distance between the fiber and lens by 4 mm. Based on a known numerical aperture (NA) of the fiber of about 0.1, it can be seen that the ideal focal length for the fixed lens 132 is about 250 mm for an output aperture of 50 mm. Based on the Newtonian equations for object/image relationships, the total focus range required is 88 mm between the near (1 meter) and far (60 meter) positions. This translates to a corner cube translation of 88/4=22 mm Therefore, the only lens required is the 2" diameter objective lens 132.

The other significant advantage of this optical assembly is that because the optical path 138 is folded twice through the corner cube 134, the 250 mm to 338 mm (88+250=338) focal length is fit into a very compact volume. The long focal length means the aberration requirements on the lens 132 are also relaxed relative to an unfolded system of shorter focal length.

A major difference between this system and systems where transmissive optics are translated is that since the fiber is the zero z-position reference, motion of the corner cube focusing element 134 changes the z-distance between the fiber 130 and the last lens element. Therefore, the system must know the position of the corner cube with sufficient accuracy to correct for this distance change. A current system parameter has an axial position measurement accuracy of 5 µm+1.25 ppm/meter of focus distance, or a minimum of 6.25 µm at 1 meter focus. The stage position must therefore be measured to 6.25/4=1.56 µm in the worst case. At far focus (60 m) the position of the stage that translates the corner cube focusing element should be measured to (5+60×1.25)/4=20 µm.

With the system of FIG. 3*a*, the input fiber 130 is centered on the diverging output beam. If the system was built according to FIG. 3*a*, the structure for holding the fiber 130 would block light and some of the light would be incident directly back onto the fiber, causing a noise floor. The alternative system shown in FIGS. 4*a*, 4*b* and 4*c* provides a way of addressing this potential issue.

Figures 4A, 4C:
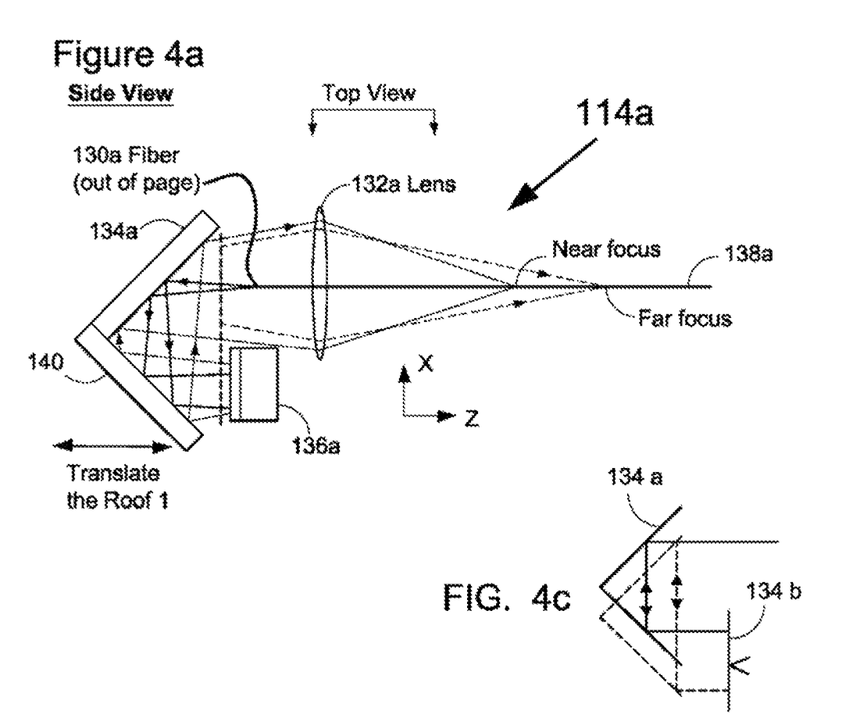
FIGS. 4a and 4b are schematic side and top illustrations of another embodiment of an optical assembly according to the present invention.
FIG. 4c is a fragmentary, schematic illustration of the optical assembly of FIGS. 4a and 4b showing the reflection schema provided by the reflective roofs of those elements.
Figure 4B:
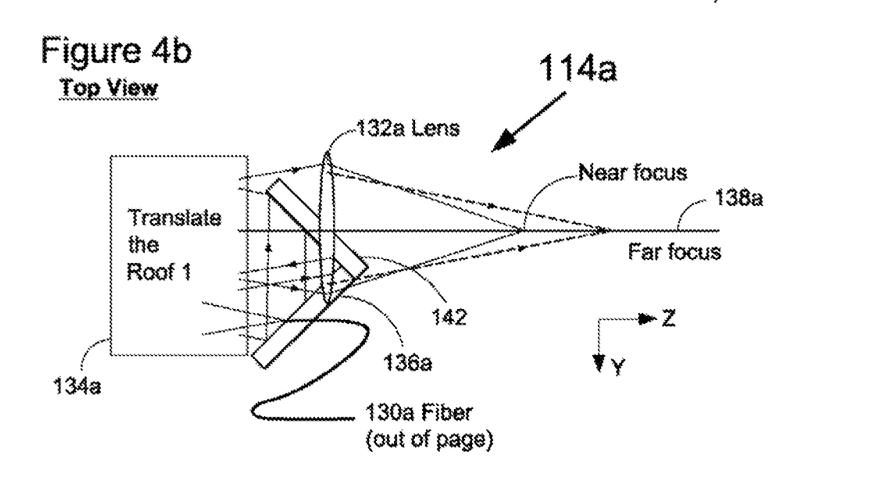

The optical assembly 114*a* shown in FIGS. 4*a*, 4*b* and 4*c* includes a fiber 130*a* that provides a source of the pointing and measurement beams, a lens 132*a*, a scanning reflector 134*a* and a fixed reflector 136*a*. The scanning reflector 134*a* comprises a reflective roof that provides two reflections of the pointing and measurement beams, and the fixed reflector 136*a* comprises a reflective roof that also provides two reflections of the pointing and measurement beams. Also, the nodal lines 140 and 142 of the reflective roofs 134*a* and 136*a*, respectively, are in a predetermined orientation relative to each other. Specifically, the nodal lines of the two roofs are perpendicular to each other, and both nodal lines are also perpendicular to the line of sight 138*a*.

The embodiment shown in FIGS. 4*a*, 4*b* and 4*c* functions in a manner that is generally similar to that of the embodiment of FIGS. 3*a* and 3*b*. The reflective roof 134*a* has a pair of reflective surfaces that are oriented so that: (i) the pointing and measurement beams from the source are reflected through the reflective roof 134*a* to the fixed reflective roof 136*a*, and the pointing and measurement beams reflected from the fixed reflective roof 136*a* are again reflected through the reflective roof 134*a*; and (ii) movement of the reflective roof 134*a* in at least one predetermined direction (e.g. the z direction in FIG. 4*a*) adjusts the focus of the pointing and measurement beams along the line of sight 138*a*. FIG. 4*c* is a fragmentary, schematic illustration of the optical assembly of FIGS. 4*a* and 4*b*, showing the reflection schema provided by the reflective roof 134*a* and the fixed reflective roof 136*a*. Thus, the pointing and measurement beams are directed along the line of sight 138*a*. The focus of the pointing and measurement beams along the line of sight is adjusted by translation of a single element (the reflective roof 134*a*) in the z direction relative to the fixed reflective roof 136*a*, the lens 132*a* and the fiber 130*a*. The optical assembly of FIGS. 4*a*, 4*b* and 4*c* is extremely compact and comprises few elements. As with the previous version, the reflective roof 134*a* can adjust the focus of the pointing and measurement beams by translation over a distance of not more than 22 mm relative to the fixed components (fiber 130*a*, fixed reflective roof 136*a* and lens 132*a*) for a given system design contributing to the compactness of the optical assembly 114*a*.

The optical assembly of FIGS. 4*a*, 4*b* and 4*c* addresses the issue of the input fiber being centered on the diverging output beam so that the structure for holding the fiber would block light and some of said light would be incident directly back on the fiber, causing a large noise floor. Specifically, instead of translating a corner cube and using a fixed mirror, the optical assembly is broken into the two reflective roofs 134*a* and 136*a*. Reflective roof 134*a* translates in place of the corner cube and reflective roof 136*a* is fixed and rotated 90 degrees about the optical axis relative to 134*a*. This optical assembly achieves many of the same advantages as the system in FIG. 3*a* with one major additional advantage: the pointing and measurement beams from the input fiber 130 go to the moving reflective roof 134*a* and are translated down by reflective roof 134*a*. The pointing and measurement beams then go to the fixed reflective roof 136*a* which shifts those beams into the page. Then the beams go back through reflective roof 134*a* and come out expanded but parallel to the input fiber 130*a*. However, thanks to the fixed roof 136*a*, the beams are translated relative to the fiber 130 in the −y direction of FIGS. 4*a* and 4*b* so there is no obscuration or backreflection issue.

If reflective roof 134*a* rotates about the y-axis while translating, it acts like a roof and does not change the angle. If it rotates about the x-axis, then reflective roof 134*a* acts like a plane mirror but fixed reflective roof 136*a* removes this angle change because fixed reflective roof 136*a* is rotated about the z-axis by 90 degrees. If reflective roof 134*a* shifts in x, it does shift the beam but then fixed reflective roof 136*a* acts like a mirror (as in the system of FIG. 3*a*) and the second pass through reflective roof 134*a* corrects the shift. Finally, if reflective roof 134*a* shifts in y, it is like a plane mirror and there is no change for the beam.

The result is a highly advantageous system. A series of first surface mirrors (two roof prisms 134*a* and 136*a*) is used to change the axial distance between the fiber 130*a* and the fixed lens 132*a*. This system is nominally insensitive to tip/tilt and x/y shift of the moving element (the reflective roof 134*a*). The output beam from this two-roof system is shifted relative to the input fiber 130*a* so there is no obscuration or back reflection issue. In addition, since all the surfaces are first surface mirrors, there are no interfaces that can create ghost reflections. The folded nature of the beam path makes it very compact and allows for a mechanically stable optical assembly. The long focal length of the system means the fixed reflective roof 136*a* can likely be an off-the-shelf color corrected doublet.

The system shown in FIG. 4*a* is, however, sensitive to rotations about the line of sight of the roof 134*a*. Any such rotation means the nodal lines of the two roofs are no longer perpendicular, and the advantages described start to erode. In a sense, the system in FIG. 4a-c trades off this error sensitivity for the advantage of the beam displacement that removes any shadowing due to the fiber being located at the center of the diverging beam.

FIGS. 5-9 schematically illustrate various concepts for configuring and orienting the components of the optical assembly.

Figure 5:
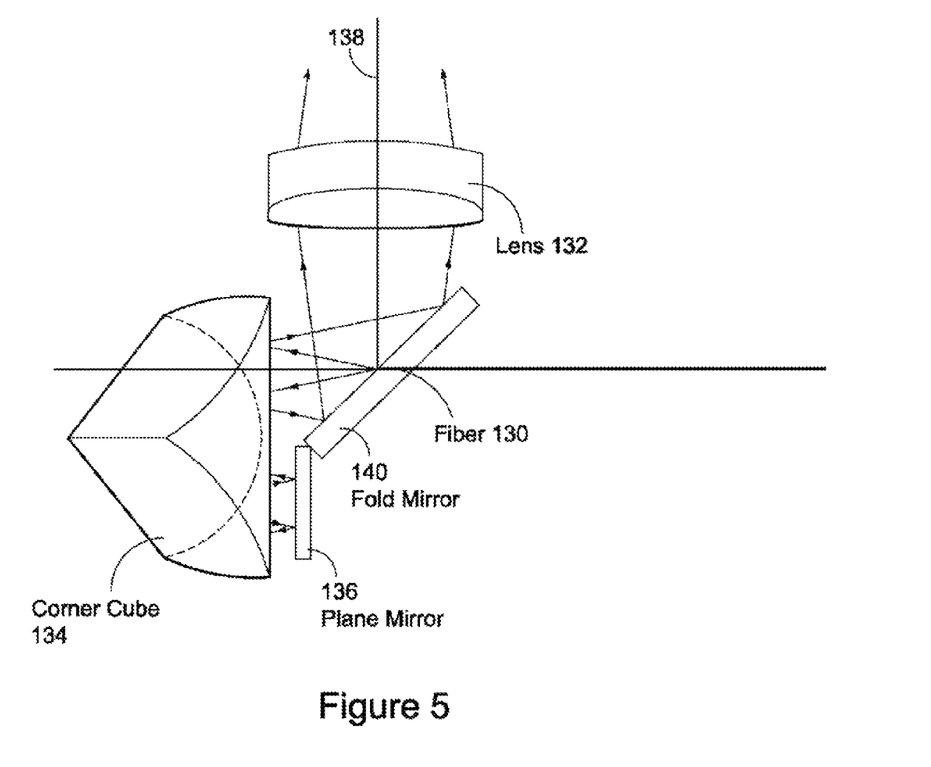
FIGS. 5-9 are schematic illustrations of additional concepts of an optical assembly according to the present invention.

For example, as shown in FIG. 5, the pointing and measurement beams reflected by the scanning reflector 134 and directed along the line of sight 138 through the lens are reflected by a fold mirror 144 that folds the light of sight 138 of the pointing and measurement beams directed through the lens 132. Moreover, the fiber 130 can be located in a hole in the fold mirror 144.

The optical assembly of the invention is designed to be focused at a range of 1 meter to 60 meters from the lens 132. When the system shown in FIG. 5 is focused at 1 meter from the lens, less light is directed to the target because the beam slightly overfills the lens aperture but the light loss is only a few percent. When the optical assembly is focused at 60 meters by movement of the corner cube 134 about 22 mm, the beam fills the aperture of the lens 132 and all of the available light is used to make the spot that impinges on the target.

Figure 6:
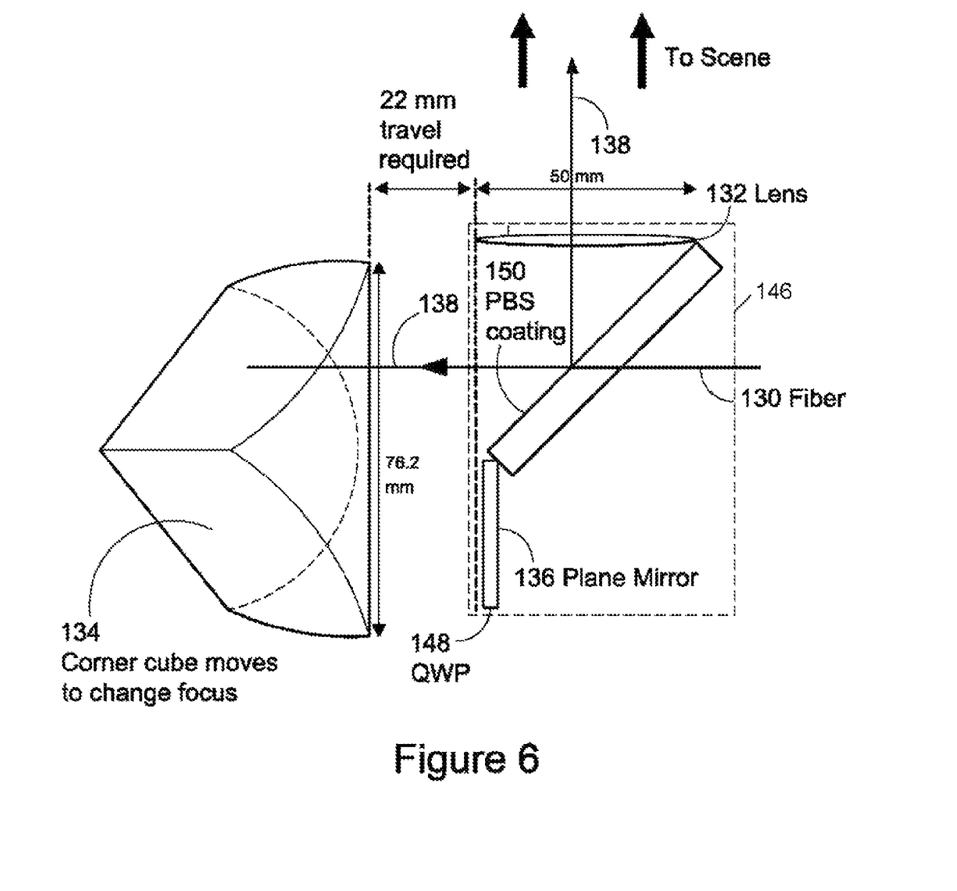

In addition, as schematically shown in FIG. 6, the lens 132, the beam source (i.e. fiber 130) and the plane mirror 136 are supported in a manner such that they can move as a unit relative to the retroreflector 134 and wherein the line of sight moves with the unit. Thus, as illustrated by FIG. 6, the lens 132, the plane mirror 136 and the fiber 130 are supported by a box 146 so that all of those components can move as a unit relative to the retroreflector 134. That the retroreflector and other components (fiber, lens and fixed reflector) are moveable "relative" to each other means that either the other components are fixed by a support structure and the retroreflector moves relative to the support structure; or that the support structure for the other components (e.g. box 146 in FIG. 6) enables those other components to move (e.g. rotate) as a unit relative to the retroreflector 134.

Moreover, as also shown in FIG. 6, the pointing and measurement beams reflected by the scanning reflector 134 and directed along the line of sight through the lens 132 are reflected by a polarization beam splitter plate 150 that folds the light of sight 138 of the pointing and measurement beams directed through the lens (in a manner similar to that shown in FIG. 5). In FIG. 6, the polarization beam splitter plate 150 has a polarization beam splitting coating that enables the polarization beam splitter plate 150 to function as a polarization beam splitter. A quarter wave plate 148 is provided on the plane mirror 136 to rotate the polarization of the beams reflected from the plane mirror 136 by 90 degrees, such that when they encounter the beam splitter plate 150 again, they are reflected. In FIG. 6, the optical fiber 130 that is the beam source is represented by a dot in a predetermined location relative to the polarization beam splitter plate 150.

Thus, in the concept shown in FIG. 6, the polarization beamsplitter plate (PBS) 150 is used to prevent the light being directed along the line of sight from coupling back into the fiber 130. Since the measurement beam is linearly polarized its polarization state can be rotated 90 degrees by twice going through the quarter wave plate (QWP) 148 oriented at 45 degrees. In this case, the QWP 148 also has the second surface mirror 136 that acts as the mirror of the system in the manner shown and described in connection with FIG. 3a. The fiber 130 is placed near the back surface of the PBS plate 150. Since it is a PBS plate and the input surface is tilted at 45 degrees relative to the fiber, any reflection off the back surface will not go back to the fiber. The corner cube 134 is solid glass since this is an off-the-shelf part and since this increases the axial distance (physical distance) between the fiber and the lens. There is no central obscuration in this optical assembly.

Also, in the concept shown in FIG. 6, the corner cube 134 can be held fixed and the plane mirror, fold mirror, lens and fiber (all of which are supported in the box 146) all rotate about the centerline of the corner cube. The rotation must be about the centerline of the corner cube otherwise the beams will move outside the edges of the corner cube during rotation. This concept of the invention can reduce the rotating mass that needs to be moved about an elevation axis, thus allowing for a smaller and lighter elevation axis motor that would reduce heat generation. Also, it results in an even more compact assembly. It can also lead to a reduction in focus stage complexity. Moreover, it requires fewer cables that need to pass through a rotating joint, simplifying cable routing, reducing cable disturbances caused by moving cables and ultimately improving motion accuracy and overall instrument performance. Thus, this aspect of the concept of FIG. 6 can produce a smaller, simpler and more cost effective optical assembly, with improved accuracy through reduction of cable disturbances.

Figure 7:
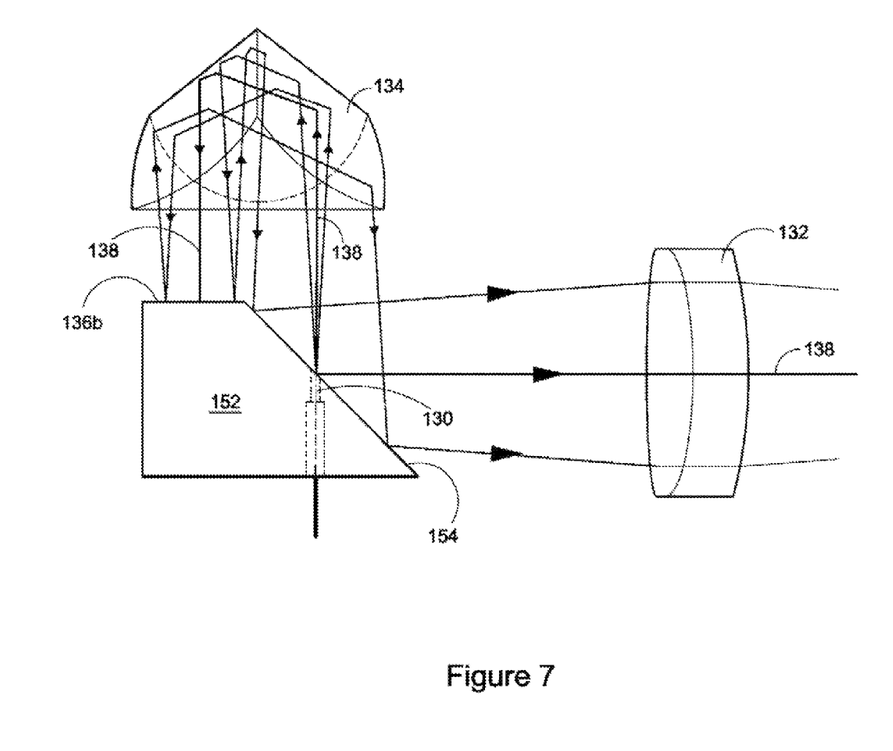

Still further, as shown schematically in FIG. 7, the source comprises an optical fiber 130 supported by a monolithic member 152 with a portion 136b that functions as the plane mirror and another portion 154 that folds the line of sight 138 of the pointing and measurement beams reflected by the scanning reflector 134 and directs them along the line of sight through the lens 132.

Figure 8:
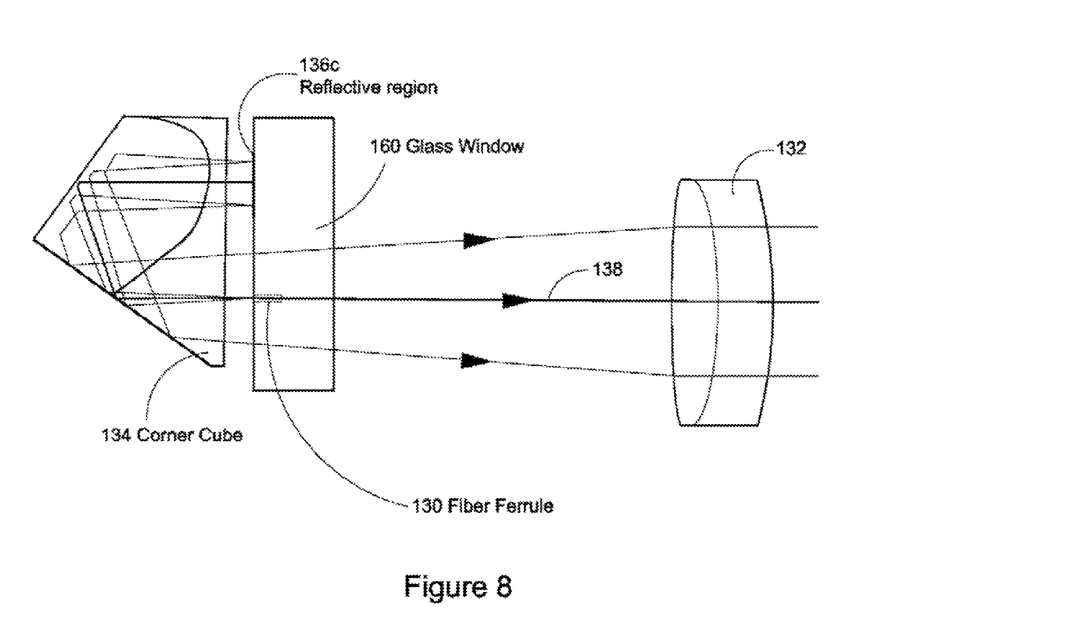
Figure 9:
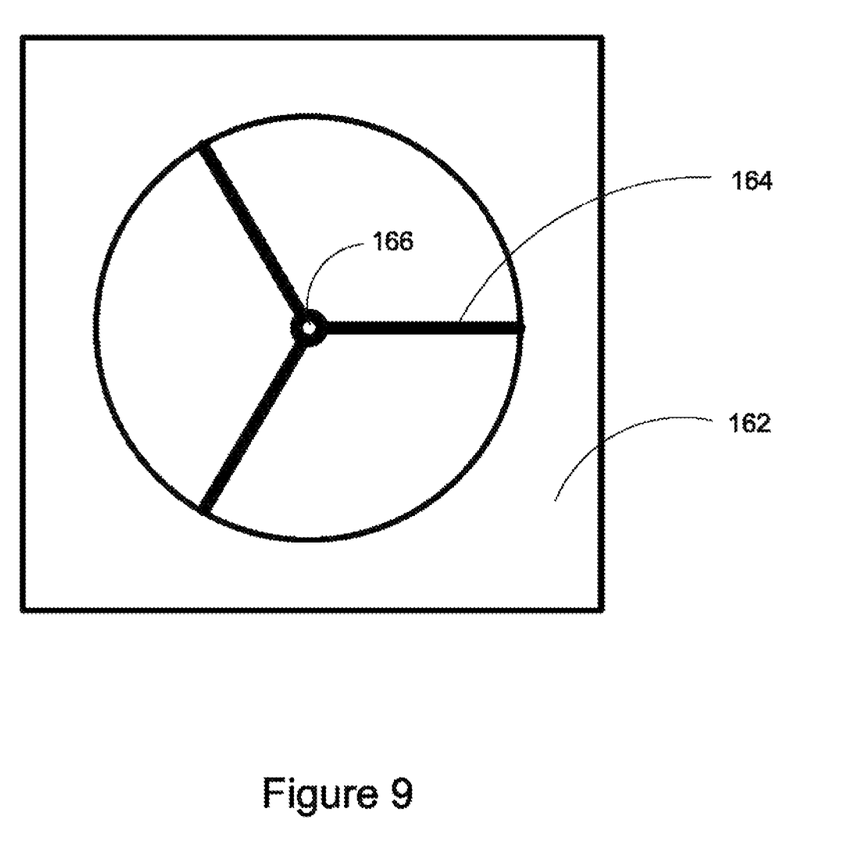

Also, as shown schematically in FIG. 8, the source can comprise an optical fiber 130 supported by a transmissive member (e.g. a glass window 160) with a reflective portion 136c thereon that forms the plane mirror. In FIG. 9, the optical fiber can be supported by a mechanical structure 162 (commonly referred to as a "spider"), attached to the piece of metal that has the reflective mirror portion 136c and includes a series of struts 164 with a central opening 166 that forms the support for the optical fiber. The spider 162 can be made of a lightweight metal such as aluminum. Thus, FIGS. 8 and 9 are similar except that in FIG. 8 the transmissive member 160 that supports the fiber is a piece of glass while in FIG. 9 the transmissive member is the air space between the mechanical components of the spider 162.

The concepts shown in FIGS. 7, 8 and 9 provide additional advantageous features to an optical assembly according to the present invention. For example, the concept of FIG. 7 uses a single substrate for both mirrors and for holding the fiber. This may allow for simpler fabrication and may allow the single substrate to be formed of relatively light weight aluminum. With respect to the concepts of FIGS. 8 and 9, replacing a fold mirror with the window or window/spider arrangement can reduce the overall weight of the optical assembly as it eliminates the weight of a fold mirror. Also, the concepts of FIGS. 8 and 9 can reduce the requirement for additional tolerances on surface figure and mirror angle position. The result is that the corner cube now moves parallel to the optical axis of the lens rather than perpendicular to it. Thus, the optical assembly is simplified as it has one fewer mirror. Moreover, the angle between the fiber hole and the mirror surface is more directly controllable when cutting normal to the surface. Also, the position of the fiber axis relative to the lens can be maintained more readily during fabrication (e.g. by holding both elements in a tube), thereby reducing the out-of-focus boresight error that occurs when the beam is not centered in the aperture. Because the fiber hole is parallel to the optical axis of the lens, it should be easier to align the fiber and lens in order to reduce thermal boresight error. Additionally, the corner cube can be closer to the fiber and can therefore be smaller in diameter.

Accordingly, as seen from the foregoing description, the present invention provides a compact optical assembly, comprising a light source, a lens, a scanning reflector and a fixed reflector that co-operate to focus a beam from the light source along a line of sight that extends through the lens. The light source, the lens, the scanning reflector and the fixed reflector are oriented relative to each other such that: (i) a beam from the light source is reflected by the scanning reflector to the fixed reflector; (ii) reflected light from the fixed reflector is reflected again by the scanning reflector and directed along the line of sight through the lens; and (iii) the scanning reflector is moveable relative to the source, the lens and the fixed reflector to adjust the focus of the beam along the line of sight.

With the foregoing description in mind, the manner in which the optical assembly of the present invention can be implemented in various types of laser radar systems, as well as other types of optical systems, will be apparent to those in the art.

The invention claimed is:

1. An optical assembly for focusing a beam along a line of sight, comprising a light source, a lens, a scanning reflector and a fixed reflector that co-operate to focus a beam from the light source along a line of sight that extends through the lens, where the light source, the lens, the scanning reflector and the fixed reflector are oriented relative to each other such that a beam from the light source is reflected by the scanning reflector to the fixed reflector, and reflected light from the fixed reflector is reflected again by the scanning reflector and directed along the line of sight through the lens, and wherein the scanning reflector is moveable relative to the light source, the lens and the fixed reflector, to adjust the focus of the beam along the line of sight.

2. The optical assembly of claim 1, wherein the scanning reflector comprises a retroreflector and the fixed reflector comprises a plane mirror.

3. The optical assembly of claim 2, wherein the light source, the lens and the plane mirror are all in fixed locations relative to the support structure for the optical assembly and the retroreflector is moveable relative to those fixed locations to vary the focus of the beam along the line of sight.

4. The optical assembly of claim 3, wherein the retroreflector comprises a corner cube that has at least three reflective surfaces that are oriented so that: (i) light from the light source is reflected through the corner cube to the plane mirror and light reflected from the plane mirror is again reflected through the corner cube; and (ii) movement of the corner cube in at least one predetermined direction adjusts the focus of the beam along the line of sight, in a manner that is substantially unaffected by movement of the corner cube in directions transverse to the predetermined direction or by rotations of the corner cube relative to the predetermined direction.

5. The optical assembly of claim 1, wherein the scanning reflector comprises a reflective roof that provides two reflections of the beam and the fixed reflector comprises a reflective roof that also provides two reflections of the beam, where the nodal lines of both reflective roofs are in a predetermined orientation relative to each other.

6. The optical assembly of claim 2, wherein the beam reflected by the scanning reflector and directed along the line of sight through the lens is reflected by a fold mirror that folds the light of sight of the beam directed through the lens.

7. The optical assembly of claim 6, wherein the lens, the light source and the plane mirror are supported in a manner such that they can move as a unit relative to the retroreflector and wherein the line of sight moves with the unit.

8. The optical assembly of claim 6, wherein the light source comprises an optical fiber supported by the fold mirror.

9. The optical assembly of claim 2, wherein the beam reflected by the scanning reflector and directed along the line of sight through the lens is reflected by a polarization beam splitter that folds the light of sight of the beam directed through the lens and wherein the light source comprises an optical fiber in a predetermined location relative to the polarization beam splitter that folds the light of sight of the beam directed through the lens.

10. The optical assembly of claim 2, wherein the light source comprises an optical fiber supported by a monolithic member that has a portion that functions as the plane mirror and another portion that folds the line of sight of the beam reflected by the scanning reflector and directed along the line of sight through the lens.

11. The optical assembly of claim 2, wherein the light source comprises an optical fiber supported by a transmissive member that also supports the plane mirror.

12. Apparatus comprising an optical unit moveable as a unit as part of a laser radar system and configured to direct a pointing beam and a measurement beam along a line of sight and through an outlet of the laser radar system; the optical assembly comprising a light source, a lens, a scanning reflector and a fixed reflector that cooperate to focus the pointing and measurement beams from the light source along a line of sight that extends through the lens, where the light source, the lens, the scanning reflector and the fixed reflector are oriented relative to each other such that the pointing and measurement beams from the light source are reflected by the scanning reflector to the fixed reflector, and reflected pointing and measurement beams from the fixed reflector are reflected again by the scanning reflector and directed along the line of sight through the lens, and wherein the scanning reflector is moveable relative to the light source, the lens and the fixed reflector to adjust the focus of the pointing and measurement beams along the line of sight.

13. The apparatus of claim 12, wherein the scanning reflector comprises a retroreflector and the fixed reflector comprises a plane mirror.

14. The apparatus of claim 13, wherein the light source, the lens and the plane mirror are all in fixed locations relative to the support structure for the optical assembly and the retroreflector is moveable relative to those fixed locations to vary the focus of the pointing and measurement beams along the line of sight.

15. The apparatus of claim 14, wherein the retroreflector comprises a corner cube that has at least three reflective surfaces that are oriented so that: (i) the pointing and measurement beams from the light source are reflected through the corner cube to the plane mirror and the pointing and measurement beams reflected from the plane mirror are again reflected through the corner cube; and (ii) movement of the corner cube in at least one predetermined direction adjusts the focus of the pointing and measurement beams along the line of sight in a manner that is substantially unaffected by movement of the corner cube in directions transverse to the predetermined direction or by rotations of the corner cube relative to the predetermined direction.

16. The apparatus of claim 12, wherein the scanning reflector comprises a reflective roof that provides two reflections of the pointing and measurement beams and the fixed reflector comprises a reflective roof that also provides two reflections of the pointing and measurement beams where the nodal lines of both reflective roofs are in a predetermined orientation relative to each other.

17. The apparatus of claim 13, wherein the pointing and measurement beams reflected by the scanning reflector and directed along the line of sight through the lens are reflected by a fold mirror that folds the light of sight of the pointing and measurement beams directed through the lens.

18. The apparatus of claim 17, wherein the lens, the light source and the plane mirror are supported in a manner such that they can move as a unit relative to the retroreflector and wherein the line of sight moves with the unit.

19. The apparatus of claim 17, wherein the light source comprises an optical fiber supported by the fold mirror.

20. The apparatus of claim 13, wherein the pointing and measurement beams reflected by the scanning reflector and directed along the line of sight through the lens are reflected by a polarization beam splitter that folds the light of sight of the pointing and measurement beams directed through the lens, and wherein the light source comprises an optical fiber in a predetermined location relative to the polarization beam splitter that folds the light of sight of the pointing and measurement beams directed through the lens.

21. The optical assembly of claim 13, wherein the light source comprises an optical fiber supported by a monolithic member that has a portion that functions as the plane mirror and another portion that folds the line of sight of the pointing and measurement beams reflected by the scanning reflector and directed along the line of sight through the lens.

22. The optical assembly of claim 13, wherein the light source comprises an optical fiber supported by a transmissive member that also supports the plane mirror.

23. The optical assembly of claim 5, wherein the light source comprises an optical fiber.

24. The optical assembly of claim 5, wherein the light source comprises an optical fiber supported by a mechanical structure.

25. The apparatus of claim 16, wherein the light source comprises an optical fiber.

26. The apparatus of claim 16, wherein the light source comprises an optical fiber supported by a mechanical structure.

* * * * *